US008825280B2

(12) United States Patent
Tanaka

(10) Patent No.: US 8,825,280 B2
(45) Date of Patent: Sep. 2, 2014

(54) VEHICLE DATA STORAGE SYSTEM, VEHICLE DATA STORAGE APPARATUS, VEHICLE DATA STORAGE SERVER, AND VEHICLE DATA STORAGE METHOD

(75) Inventor: Keiichi Tanaka, Okazaki (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 161 days.

(21) Appl. No.: 13/055,314

(22) PCT Filed: Jul. 24, 2009

(86) PCT No.: PCT/IB2009/006340

§ 371 (c)(1), (2), (4) Date: Jan. 21, 2011

(87) PCT Pub. No.: WO2010/010452

PCT Pub. Date: Jan. 28, 2010

(65) Prior Publication Data

US 2011/0131666 A1 Jun. 2, 2011

(30) Foreign Application Priority Data

Jul. 25, 2008 (JP) ................................ 2008-192393

(51) Int. Cl.
*G01M 17/00* (2006.01)
*G06F 7/00* (2006.01)
*B60Q 1/00* (2006.01)

(52) U.S. Cl.
USPC .......... 701/33.4; 701/33.6; 340/439; 340/459

(58) Field of Classification Search
USPC ........................................................ 701/33.4
See application file for complete search history.

(56) References Cited

U.S. PATENT DOCUMENTS 6,480,783 B1 * 11/2002 Myr .............................. 701/117
6,625,457 B1 * 9/2003 Raith ........................ 455/456.1

(Continued)

FOREIGN PATENT DOCUMENTS

EP 1 811 481 A1 7/2007
GB 2 015 222 A 9/1979

(Continued)

OTHER PUBLICATIONS

International Search Report and Written Opinion for corresponding International Patent Application No. PCT/IB2009/006340 mailed Oct. 26, 2009.

(Continued)

*Primary Examiner* — Thomas Black
*Assistant Examiner* — Tyler Paige
(74) *Attorney, Agent, or Firm* — Sughrue Mion, PLLC

(57) ABSTRACT

A vehicle data storage system, in which vehicle data obtained from a vehicle-mounted device is stored, includes a vehicle data storage portion in which the vehicle data is stored; a country determination portion that determines a country in which a vehicle exists, based on position data of the vehicle; a selection table storage portion in which a type of the vehicle data that should be stored in the vehicle data storage portion is stored in association with country data; a data determination portion that determines the type of the vehicle data that should be stored in the vehicle data storage portion, based on the country determined by the country determination portion, by referring to the selection table storage portion; and a data processing portion that stores, in the vehicle data storage portion, the vehicle data determined by the data determination portion.

7 Claims, 15 Drawing Sheets

(56) References Cited

U.S. PATENT DOCUMENTS

| | | | | |
|---|---|---|---|---|
| 6,801,851 | B2 * | 10/2004 | Kawakami | 701/533 |
| 7,117,075 | B1 * | 10/2006 | Larschan et al. | 701/29.6 |
| 8,467,954 | B2 * | 6/2013 | Kobuya et al. | 701/400 |
| 2003/0151677 | A1 * | 8/2003 | Obradovich | 348/231.3 |
| 2007/0038348 | A1 | 2/2007 | Larschan et al. | |
| 2007/0064263 | A1 * | 3/2007 | Silverbrook et al. | 358/1.15 |
| 2007/0276595 | A1 * | 11/2007 | Lewinson et al. | 701/209 |
| 2008/0162041 | A1 * | 7/2008 | Nakamura | 701/209 |
| 2008/0167798 | A1 * | 7/2008 | Tertoolen | 701/200 |

FOREIGN PATENT DOCUMENTS

| | | | |
|---|---|---|---|
| GB | 2 271 180 | A | 4/1994 |
| JP | 2000-145533 | A | 5/2000 |
| JP | 2000-348466 | A | 12/2000 |
| JP | 2002-159043 | A | 5/2002 |
| JP | 2004-009878 | A | 1/2004 |
| JP | 2004-192277 | A | 7/2004 |
| JP | 2005-053373 | A | 3/2005 |
| JP | 2005-182263 | A | 7/2005 |
| JP | 2007-004378 | A | 1/2007 |
| JP | 2007-265183 | A | 10/2007 |

OTHER PUBLICATIONS

Japanese Office Action for corresponding Japanese Patent Application No. 2008-192393 drafted Jun. 10, 2010.

* cited by examiner

FIG. 3

| COUNTRY DATA | IDENTIFICATION DATA USED TO IDENTIFY VEHICLE DATA THAT SHOULD BE STORED |
|---|---|
| COUNTRY X | A1 TO A3<br>B1 TO B3<br>C1 TO C3 |
| COUNTRY Y | B1、B3<br>C1、C2 |
| COUNTRY Z | – |

VEHICLE DATA STORAGE SYSTEM, VEHICLE DATA STORAGE APPARATUS, VEHICLE DATA STORAGE SERVER, AND VEHICLE DATA STORAGE METHOD

BACKGROUND OF THE INVENTION

1. Field of the Invention

The invention relates to a vehicle data storage system, a vehicle data storage apparatus, a vehicle data storage server, and a vehicle data storage method, in which vehicle data obtained from a vehicle-mounted device is stored.

2. Description of the Related Art

In a vehicle, electronic control units supply control signals to actuators according to detection signals transmitted from sensors, thereby controlling vehicle-mounted devices such as an engine. The detection signals and the control signals are stored as vehicle data in a storage apparatus at given time intervals. For example, if an abnormality occurs, the vehicle data is also stored in each electronic control unit. All the vehicle data stored in the storage apparatus are not necessarily useful for analyzing an abnormality. Thus, Japanese Patent Application Publication No. 2000-145533 (JP-A-2000-145533) describes a technology in which vehicle data that should be stored is selected. More specifically, the publication No. 2000-145533 describes an electronic control unit for a vehicle, which sets the vehicle data that should be stored, according to a signal indicating a portion in which an abnormality occurs.

The vehicle data may include position data detected, for example, by a Global Positioning System (GPS). Therefore, there is a possibility that a third person determines activities of a vehicle user in the past, based on the position data stored in the storage apparatus. Thus, Japanese Patent Application Publication No. 2007-4378 (JP-A-2007-4378) describes a drive recorder that indicates the position data of the vehicle when an abnormality occurs using the position of the vehicle relative to a predetermined reference point. In the technology described in the publication No. 2007-4378, the absolute coordinate of the predetermined reference point is stored in, for example, a memory card that is different from the storage apparatus. Therefore, it is not possible to determine the activities of the vehicle user in the past only by the position data stored in the storage apparatus.

Japanese Patent Application Publication. No. 2004-192277 (JP-A-2004-192277) describes a technology in which a vehicle communicates with the outside via a cellular phone or a communication device on a road, and access to a storage apparatus from the outside is prevented. More specifically, the publication No. 2004-192277 describes a vehicle diagnostic system in which an access permission condition for permitting the access to the storage apparatus is set, and it is determined whether the access to the storage apparatus from the outside should be permitted, based on the access permission condition.

In general, specifications of vehicles for each country are determined, and the vehicles with the specifications for each country are manufactured. However, although the vehicles with the specifications for each country are manufactured and shipped, the specifications of the vehicles may not necessarily comply with requirements in the country where the vehicles travel, for example, in Europe where the vehicles frequently cross a national boundary. For example, because the above-described vehicle data (particularly the position data) is similar to personal data, the law in each country generally stipulates how to handle the vehicle data. However, the laws in different countries do not necessarily stipulate that the vehicle data should be handled in the same manner. That is, the vehicle data, which is legally permitted to be stored in one country, may not be legally permitted to be stored in the other country into which the vehicle moves after crossing a national boundary. Also, according to the laws in some countries, the vehicle data is prohibited from being stored in association with an individual, regardless of type of the vehicle data to be stored.

Therefore, although the drive recorder described in the publication No. 2007-4378 makes it difficult to determine the absolute position of the vehicle, the drive recorder does not necessarily comply with the law. Also, because the vehicle diagnostic system described in the publication No. 2004-192277 determines whether the access should be permitted after the vehicle data is stored, on the assumption that the vehicle data is stored, it may be determined that the vehicle diagnostic system has inappropriate specifications in some countries.

It is conceivable to follow the severest law among laws concerning the handling of personal data in different countries. However, if the vehicle data that should be stored are limited, the vehicle data useful for analyzing an abnormality may not be stored. This may greatly reduce the usefulness of the storage apparatus. In the technology described in each of the publication No. 2007-4378 and the publication No. 2004-192277, consideration is not given to the possibility that laws in different countries stipulate that the vehicle data should be stored in different manners.

SUMMARY OF THE INVENTION

The invention provides a vehicle data storage system, a vehicle data storage apparatus, a vehicle data storage server, and a vehicle data storage method, in which vehicle data is stored according to a law concerning handling of, for example, personal data in each country.

A first aspect of the invention relates to a vehicle data storage system in which vehicle data obtained from a vehicle-mounted device is stored. The vehicle data storage system includes a vehicle data storage portion in which the vehicle data is stored; a country determination portion that determines a country in which a vehicle exists, based on position data of the vehicle; a selection table storage portion in which a type of the vehicle data that should be stored in the vehicle data storage portion is stored in association with country data; a data determination portion that determines the type of the vehicle data that should be stored in the vehicle data storage portion, based on the country determined by the country determination portion, by referring to the selection table storage portion; and a data processing portion that stores, in the vehicle data storage portion, the vehicle data determined by the data determination portion.

According to the first aspect of the invention, it is possible to change the type of the vehicle data that should be stored, according to the position at which the vehicle exists (the country in which the vehicle exists). Thus, it is not necessary to set the vehicle data that should be stored in each country, when the vehicle is shipped.

The vehicle data storage system according to the first aspect may further include an abnormality data storage portion in which the vehicle data is stored if an abnormality occurs in the vehicle or the vehicle-mounted device.

With the configuration, it is possible to change the vehicle data that should be stored if an abnormality occurs, according to the position at which the vehicle exists (the country in which the vehicle exists).

The vehicle data storage system according to the first aspect may further include a readout prohibition portion that prohibits readout of the vehicle data that is not the vehicle data that should be stored in the country, among all the vehicle data stored in the vehicle data storage portion, or erases the vehicle data that is not the vehicle data that should be stored in the country.

With the configuration, even if the vehicle data, which has been stored, is not legally permitted to be stored in the country into which the vehicle moves after crossing a national boundary, it is possible to comply with the law in the country by prohibiting at least readout of the vehicle data.

According to the above-described aspect, it is possible to provide the vehicle data storage system, the vehicle data storage apparatus, the vehicle data storage server, and the vehicle data storage method, in which the vehicle data is stored according to a law concerning handling of, for example, personal data in each country.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIG. 3 is a diagram showing an example of a stored data selection table;

DETAILED DESCRIPTION OF EMBODIMENTS

Hereinafter, embodiments of the invention will be described with reference to the drawings.

Figure 1:
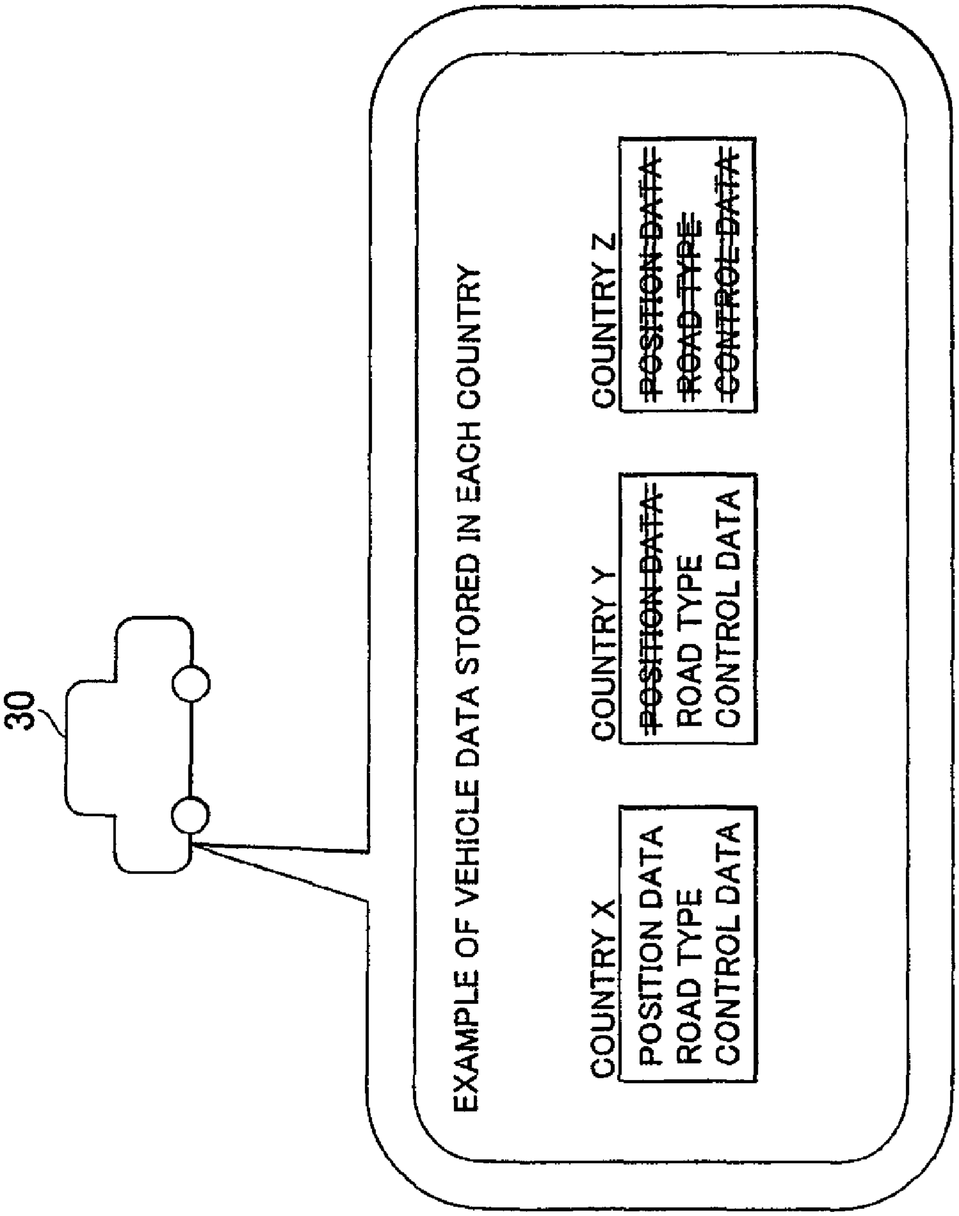
FIG. 1 is a diagram showing an example of vehicle data stored in each country.

FIG. 1 is a diagram showing an example of vehicle data stored in each country. As shown in FIG. 1, when a vehicle 30 is traveling in a country X, position data, a road type, and control data are stored. When the vehicle 30 is traveling in a country Y, the road type and the control data are stored. When the vehicle 30 is traveling in a country Z, no vehicle data is stored.

The vehicle data that should be stored in each country may be determined based on country data concerning the country in which the vehicle 30 exists, by referring to a stored data selection table in which the vehicle data that should stored in each country is defined. The country in which the vehicle 30 exists is determined based on the data concerning the position of the vehicle 30.

Accordingly, it is possible to handle personal data in various manners according to laws in different countries, using one vehicle data storage system. Also, because it is possible to determine the vehicle data that should be stored in each country, the vehicle data need not necessarily be handled according to the severest law among laws concerning the handling of personal data in different countries. Thus, it is possible to use an abnormality analysis function of a vehicle data storage system 100 most effectively.

Although the vehicle data is generally stored in the vehicle 30, the vehicle data may be stored in a predetermined server. In view of this, the vehicle data storage system 100 may be implemented in the following embodiments. In a first embodiment, the vehicle 30 includes the stored data selection table, the vehicle 30 determines the vehicle data that should be stored, by referring to the stored data selection table, and the vehicle data is stored in the vehicle 30. In a second embodiment, a server includes the stored data selection table, and the vehicle data designated by the server is stored in the vehicle 30. In a third embodiment, the server includes the stored data selection table, the server determines the vehicle data that should be stored, by referring to the stored data selection table, and the vehicle data is stored in the server. In a fourth embodiment, the vehicle 30 includes the stored data selection table, and the vehicle data transmitted from the vehicle 30 is stored in the server. Hereinafter, the above-described embodiments will be described.

The vehicle data storage system 100 in the first embodiment will be described. In the first embodiment, the vehicle 30 includes the stored data selection table, the vehicle 30 determines the vehicle data that should be stored, by referring to the stored data selection table, and the vehicle data is stored in the vehicle 30.

Figure 2:
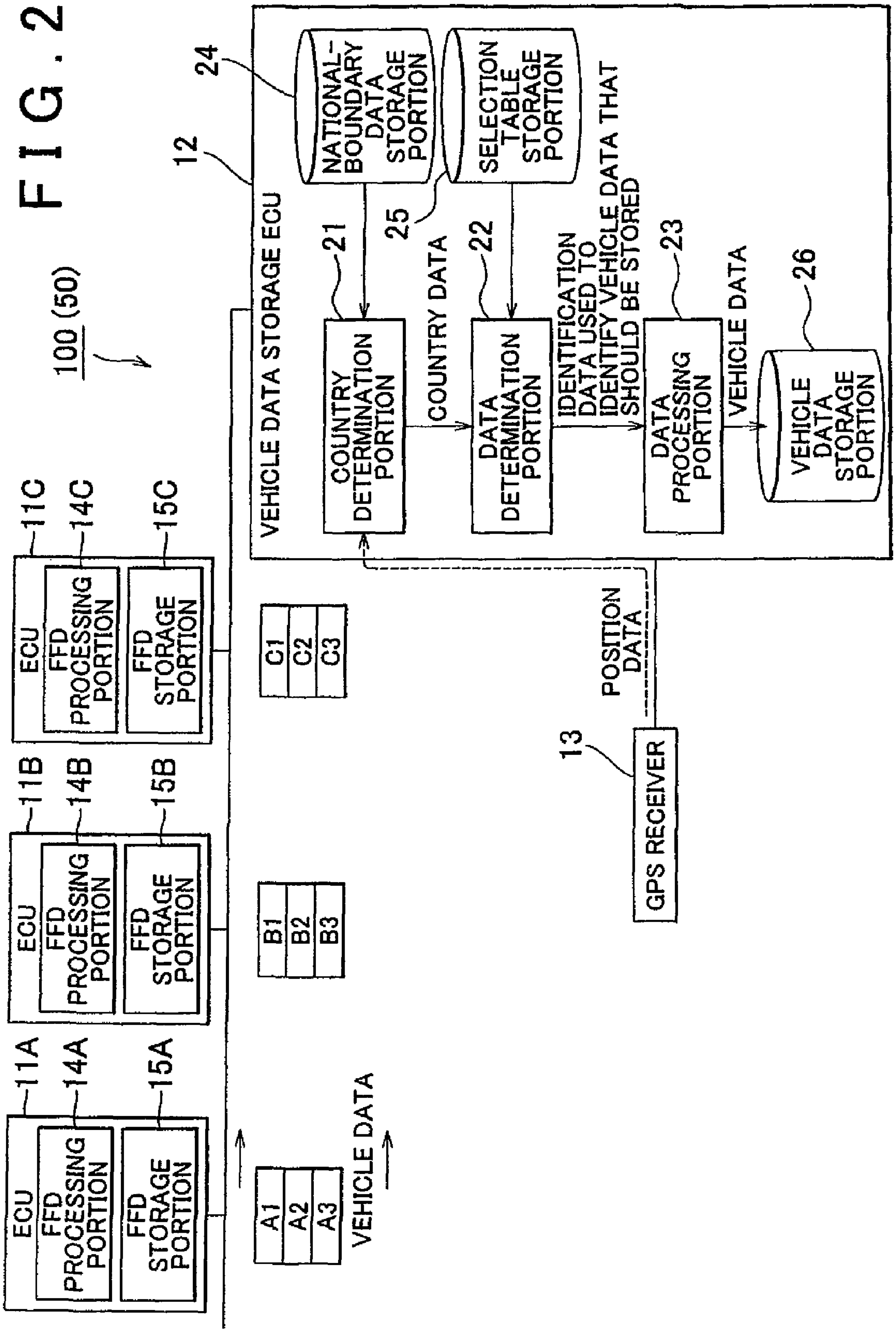
FIG. 2 is an example of a functional block diagram of a vehicle data storage system in a first embodiment.

FIG. 2 is an example of a functional block diagram of a vehicle data storage apparatus 50 according to the first embodiment. The vehicle data storage device 50 is controlled by a vehicle data storage Electronic Control Unit (ECU) 12. The vehicle data storage ECU 12 is connected to ECUs 11A to 11C (the ECUs may be simply referred to as "ECUs 11" when the ECUs need not be distinguished from each other), and a Global Positioning System (GPS) receiver 13 via a vehicle-mounted LAN, such as a Controller Area Network (CAN) or a Local Interconnect Network (LIN). In the first embodiment, the vehicle data storage apparatus 50 is integrated with the vehicle data storage system 100 described later in the second to fifth embodiments.

Each ECU 11 is connected to an actuator, a sensor, and a switch (each of the ECU, the actuator, the sensor, and the switch may be referred to as "vehicle-mounted device"). Each ECU 11 receives a detection signal transmitted from the sensor and an on/off signal indicating the on/off state of the switch, which is turned on/off according to operation performed by an occupant or operation of the vehicle-mounted devices. Each ECU 11 generates a control signal and controls the actuator, based on the detection signal and the on/off signal. The detection signal, the on/off signal, and control data, which are detected by a predetermined ECU 11, may be transmitted to the other ECUs 11 through, for example, time-division multiplex communication provided by the CAN. Accordingly, for example, each ECU 11 controls the actuator, using not only the detection signal transmitted from the sensor connected to the ECU 11, but also the detection signals transmitted from the sensors connected to the other ECUs 11.

In the first embodiment, the detection signal, the on/off signal, and the control data are regarded as the vehicle data. However, all the data that can be obtained by the vehicle data storage ECU 12 in the vehicle may be regarded as the vehicle data. In each ECU 11, the vehicle data that should be transmitted to the vehicle data storage ECU 12 is defined. Each ECU 11 transmits the vehicle data to the vehicle data storage ECU 12 at intervals of a predetermined cycle time. When a predetermined event occurs, for example, when an abnormality is detected, or when the vehicle data storage ECU 12 requests for the vehicle data in each ECU 11, each ECU 11 transmits the vehicle data to the vehicle data storage ECU 12. In the first embodiment, for example, the ECU 11A transmits vehicle data A1 to A3, the ECU 11B transmits vehicle data B1 to B3, and the ECU 11C transmits vehicle data C1 to C3, to the vehicle data storage ECU 12.

Each ECU 11 may be, for example, an engine ECU, a brake ECU, a navigation ECU, or a hybrid ECU. One or two ECUs 11, or four or more ECUs 11 may be connected to the vehicle data storage ECU 12. The vehicle data in the engine ECU may include, for example, an engine speed, an intake air amount, and an intake air temperature. The vehicle data in the brake ECU may include, for example, a vehicle wheel speed, deceleration, and a master cylinder pressure. The vehicle data in the navigation ECU may include, for example, the position data, a traveling direction, a UPS time, and the road type. The vehicle data in the hybrid ECU may include, for example, motor drive torque and a state of charge in a battery.

If each ECU 11 detects an abnormality based on no response from the actuator, the sensor and the switch, or an abnormal value of the detection signal, freeze frame data (hereinafter referred to as "FFD") is stored in a non-volatile memory in the ECU 11. The ECUs 11A to 11C include FFD processing portions 14A to 14C, respectively (hereinafter, the FFD processing portions 14A to 14C may be simply referred to as "FFD processing portions 14" when the FFD processing portions need not be distinguished from each other), and FFD storage portions 15A to 15C, respectively (hereinafter, the FFD storage portions 15A to 15C may be simply referred to as "FFD storage portions 15" when the FFD storage portions need not be distinguished from each other). If an abnormality is detected, the FFD processing portion 14 of each ECU 11 stores predetermined FFD in the FFD storage portion 15. The FFD processing portion 14 stores, in the FFD storage portion 15, a Diagnosis Trouble Code (DTC) indicating the detail of the abnormality, in association with the FFD. The DTC, which includes at least one symbol and/or at least one number, indicates the detail of the abnormality. For example, a mechanic understands the detail of the abnormality by searching for the corresponding DTC in a predetermined code table.

The FFD and the vehicle data partly overlap with each other. Therefore, the FFD needs to be handled in a manner appropriate for each country, as well as the vehicle data. It is preferable that the FFD processing portion 14 should store, in the FFD storage portion 15, only the vehicle data that is permitted to be stored, by a data determination portion 22 (described later). The vehicle data are stored in chronological order in the vehicle data storage ECU 12, and an amount of the vehicle data stored in the vehicle data storage ECU 12 is large. In contrast, because the FFD is stored only when an abnormality is detected, the importance of the FFD as the data used to identify an individual differs from the importance of the vehicle data. Therefore, it is determined whether the FFD should be handled in the same manner as the manner in which the vehicle data is handled, according to the law in each country.

The GPS receiver 13 detects the position of the vehicle 30 based on the time of arrival of radio waves transmitted from a GPS satellite. The vehicle data storage ECU 12 accurately estimates the position of the vehicle 30 that is traveling, by accumulating travel distances detected by a wheel speed sensor in the traveling direction detected by a gyro sensor.

The vehicle data storage ECU 12 will be described. The vehicle data storage ECU 12 includes a CPU, a RAM, a ROM, an input/output interface, an Application Specific Integrated Circuit (ASIC), a CAN communication portion, and a memory. The vehicle data storage ECU 12 includes a country determination portion 21, the data determination portion 22, and a data processing portion 23. The country determination portion 21, the data determination portion 22, and the data processing portion 23 are realized when the CPU executes a program stored in, for example, the ROM, or realized by hardware such as the ASIC. A national-boundary data storage portion 24, a selection table storage portion 25, and a vehicle data storage portion 26 are provided in the memories such as a flash memory, a hard disc drive, and the RAM. In the national-boundary data storage portion 24, data concerning a national boundary is stored. In the selection table storage portion 25, the stored data selection table is stored. In the vehicle data storage portion 26, the vehicle data is stored.

The vehicle data storage ECU 12 may have any configuration, as long as the vehicle data storage ECU 12 includes the memory in which the vehicle data is stored. Therefore, instead of configuring the vehicle data storage ECU 12 as a single ECU, for example, the ECU, which controls a navigation system, may function as the vehicle data storage ECU 12. Any ECU 11 may function as the vehicle data storage ECU 12. When one ECU functions as the vehicle data storage ECU 12 and the other ECU, it is possible to reduce a vehicle weight or a space occupied by the ECUs.

The country determination portion 21 determines the country in which the vehicle 30 is currently traveling, based on the position data, by referring to the national-boundary; data storage portion 24. In the national-boundary data storage portion 24, data on coordinates (i.e., latitudes, longitudes, and altitudes) of the boundary of each country is registered. The country determination portion 21 detects the coordinate of the boundaries closest to the vehicle 30, based on the position data concerning the position of the vehicle 30. The detected coordinate indicates a point shared by boundaries of two countries. Thus, the coordinates of the boundary of one of the two countries are tracked. If the position of the vehicle 30, which is indicated by the position data that is received last, is surrounded by the boundary of the country, it is determined that the vehicle 30 is traveling in the country. If not, the coordinates of the boundary of the other country are tracked, and the same determination is performed. The country determination portion 21 transmits the country data, which is obtained by performing the determination, to the data determination portion 22.

The data determination portion 22 determines the vehicle data that should be stored in the country, based on the country data, by referring to the stored data selection table stored in the selection table storage portion 25. The identification data used to identify the determined vehicle data that should be stored is transmitted to the data processing portion 23.

FIG. 3 is an example of the stored data selection table. In the stored data selection table, the identification data used to identify the vehicle data that should be stored is registered in association with the country data concerning each country. There is a high possibility that, for example, the position data, the traveling direction, the UPS time, the road type, and a vehicle speed may be restricted from being stored. For example, the data A1 to A3, the data B1 to B3, and the data C1 to C3 are registered for the country X. The data B1 and B3, and the data C1 and C2 are registered for the country Y. No vehicle data is registered for the country Z. Accordingly, the data determination portion 22 determines the vehicle data that should be stored (i.e., the vehicle data that is permitted to be stored) by referring to the stored data selection table. The identification data used to identify the vehicle data that is prohibited from being stored in each country may be registered in the selection table storage portion 25, instead of registering, in the selection table storage portion 25, the identification data used to identify the vehicle data that should be stored. When the number of types of the vehicle data that should be stored is large, the capacity of the selection table storage portion 25 is saved by registering the vehicle data that should be restricted from being stored.

The stored data selection table is stored in the vehicle 30 when the vehicle 30 is shipped from a manufacturer. However, the stored data selection table can be updated as required by accessing the above-described server so that the stored data selection table can be changed according to the revision of the law in each country.

The data processing portion 23 stores, in the vehicle data storage portion 26, only the vehicle data determined by the data determination portion 22 among all the vehicle data transmitted from the ECUs 11. That is, even if each ECU 11 transmits the vehicle data, only the vehicle data, which is permitted to be stored among all the vehicle data, is Stored in the vehicle data storage ECU 12, and the other data are discarded. The vehicle data are stored in chronological order in the vehicle data storage portion 26. When the storage capacity is limited, the vehicle data are overwritten in order from the oldest data.

Each ECU 11 may transmit only the vehicle data permitted to be stored, to the vehicle data storage ECU 12. In this case, the data determination portion 22 transmits, to each ECU 11, the identification data used to identify the vehicle data that should be stored. Each ECU 11 transmits only the vehicle data indicated by the identification data transmitted from the data determination portion 22. Thus, the data processing portion 23 stores, in the vehicle data storage portion 26, alt the vehicle data received from the ECUs 11. Thus, it is possible to reduce the amount of the vehicle data transmitted from each ECU 11. Accordingly, it is possible to reduce communication congestion in the CAN.

When each ECU 11 restricts the storage of the FFD as well as the vehicle data, each ECU 11 receives the identification data used to identify the vehicle data permitted to be stored, from the data determination portion 22. If an abnormality is detected, the FFD processing portion 14 stores, in the FFD storage portion 15, only the FFD permitted to be stored.

Figure 4:
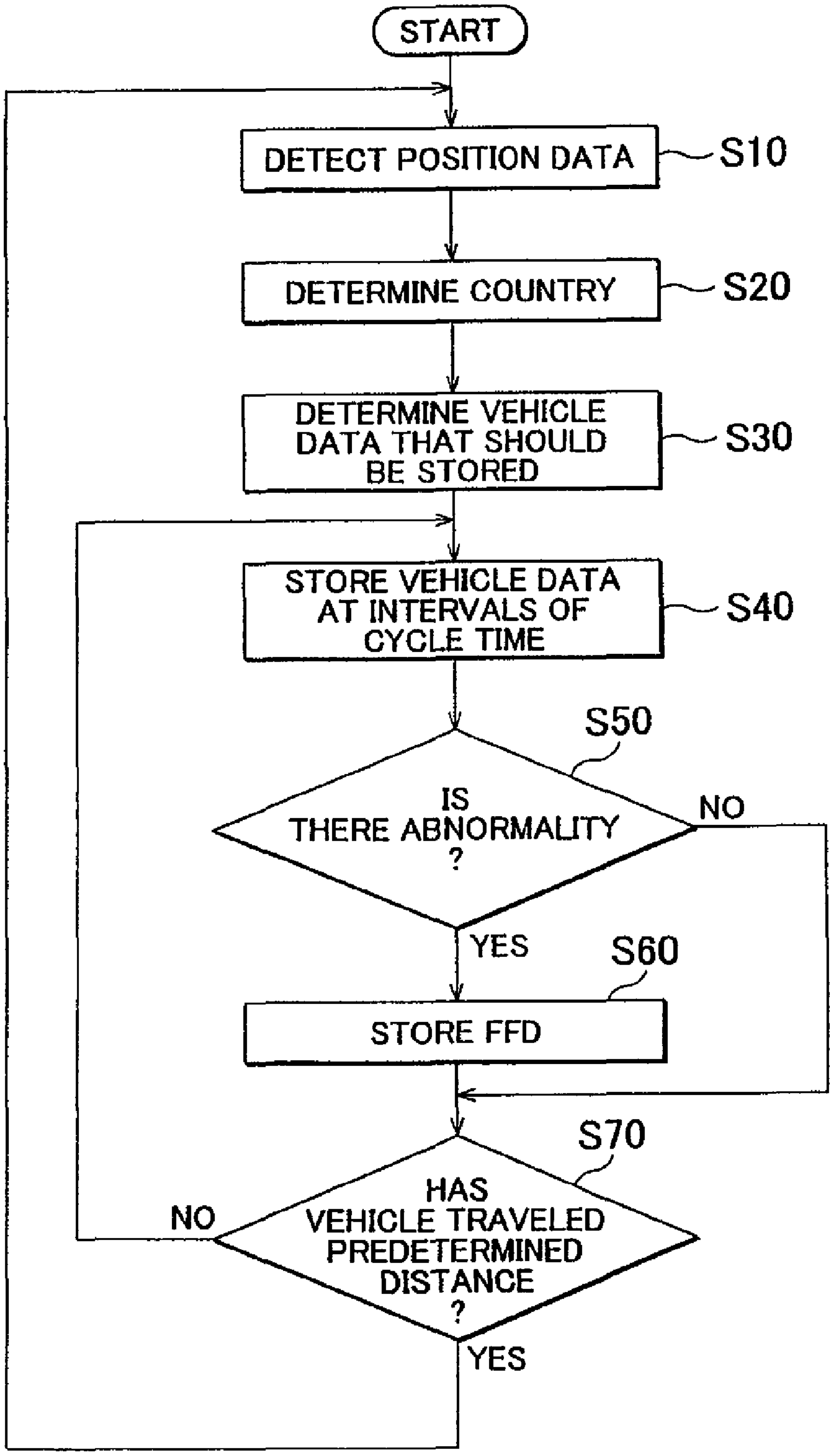
FIG. 4 is an example of a flowchart showing procedures for storing vehicle data in the vehicle data storage system in the first embodiment.

FIG. 4 is an example of a flowchart showing procedures for storing the vehicle data in the vehicle data storage apparatus 50. A sequence shown in the flowchart in FIG. 4 is started, for example, when an ignition switch is turned on.

The vehicle data storage ECU 12 detects the position data using the GPS receiver 13, the gyro sensor, and the wheel speed sensor (S10). The country determination portion 21 determines the country in which the vehicle 30 is currently traveling, based on the position data, by referring to the national-boundary data storage portion 24 (S20). The data determination portion 22 obtains the country data from the country determination portion 21, and determines the vehicle data that should be stored, based on the obtained country data, by referring to the selection table storage portion 25 (S30). The data determination portion 22 transmits the identification data used to identify the determined vehicle data that should be stored, to each ECU 11 so that the FFD is also stored according to the law in each country.

The data processing portion 23 stores, in the vehicle data storage portion 26, only the vehicle data permitted to be stored at intervals of a predetermined cycle time (S40). If an abnormality occurs (YES in step S50), the FFD processing portion 14 stores, in the FFD storage portion 15, only the FFD permitted to be stored (S60).

Then, the country determination portion 21 determines whether the vehicle 30 has traveled a predetermined distance since the country determination portion 21 determines the country last time (S70). Because the vehicle 30 does not frequently cross a national boundary, the country determination portion 21 determines the country in which the vehicle 30 is traveling, at intervals of a predetermined distance. The predetermined distance may be, for example, approximately 1 km to 5 km. When the vehicle 30 has not traveled the predetermined distance (NO in step S70), the data processing portion 23 stores the vehicle data in the vehicle data storage portion 26 at intervals of the predetermined cycle time. When the vehicle 30 has traveled the predetermined distance (YES in step S70), the country determination portion 21 determines the country in which the vehicle 30 is traveling, again (S10). The vehicle data storage apparatus 50 repeatedly executes the above-described sequence while the ignition switch is on. Thus, it is possible to store only the vehicle data permitted to be stored in the country.

As described above, in the vehicle data storage apparatus 50 in the first embodiment, it is possible to store the vehicle data according to the various laws concerning the handling of personal data in different countries.

The vehicle data storage system 100 in the second embodiment will be described. In the second embodiment, the server includes the stored data selection table, and the vehicle data designated by the server is stored in the vehicle 30.

Figure 5:
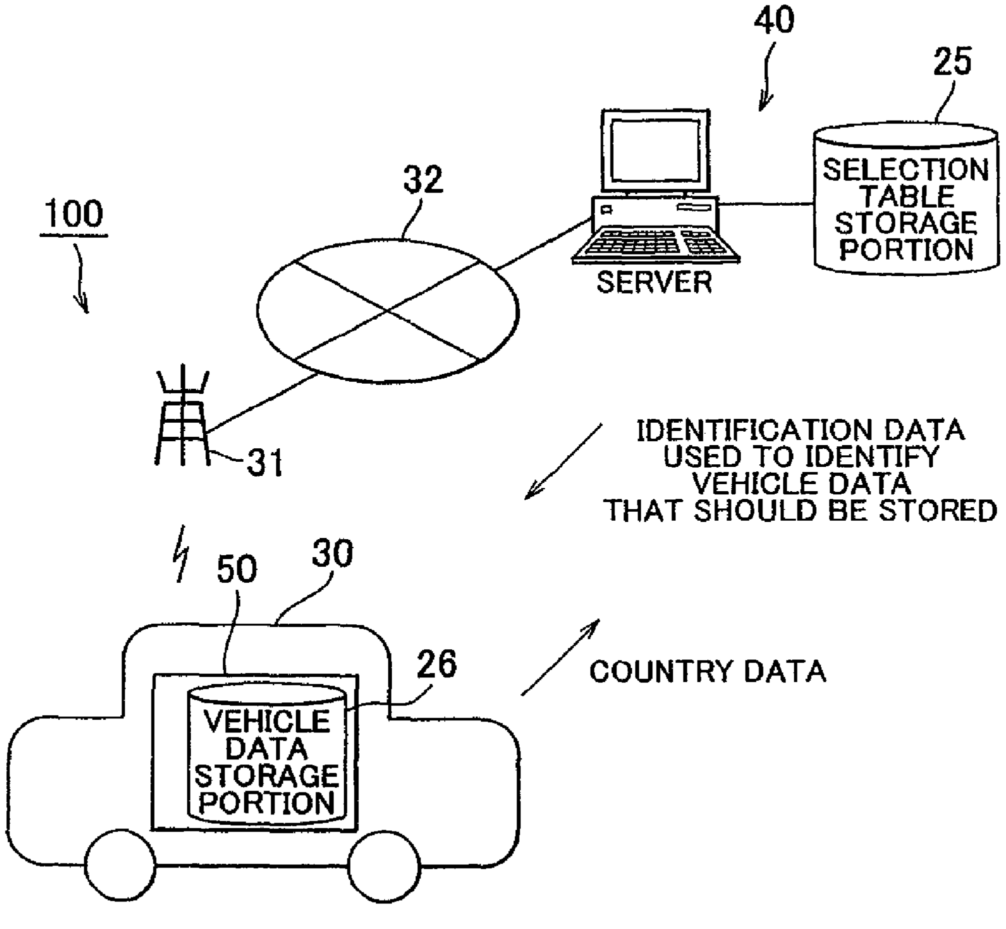
FIG. 5 is an example of a schematic configuration diagram of a vehicle data storage system in a second embodiment.

FIG. 5 is a schematic configuration diagram of the vehicle data storage system 100. In the second embodiment, the vehicle 30 includes the vehicle data storage portion 26, and a server 40 includes the selection table storage portion 25. That is, the vehicle data storage ECU 12 does not determine the vehicle data that should be stored. The vehicle data storage ECU 12 receives the identification data used to identify the vehicle data that is permitted to be stored (or prohibited from being stored), from the server 40. The vehicle 30 transmits, to the server 40, the country data concerning the country in which the vehicle 30 is traveling so that the server 40 determines the vehicle data that should be stored.

Accordingly, in the second embodiment, the selection table storage portion 25 need not be stored in the vehicle data storage ECU 12. Therefore, it is possible to suppress an increase in cost. Also, instead of the vehicle 30, the server 40 updates the stored data selection table. Therefore, the stored data selection table is easily updated.

Figure 6:
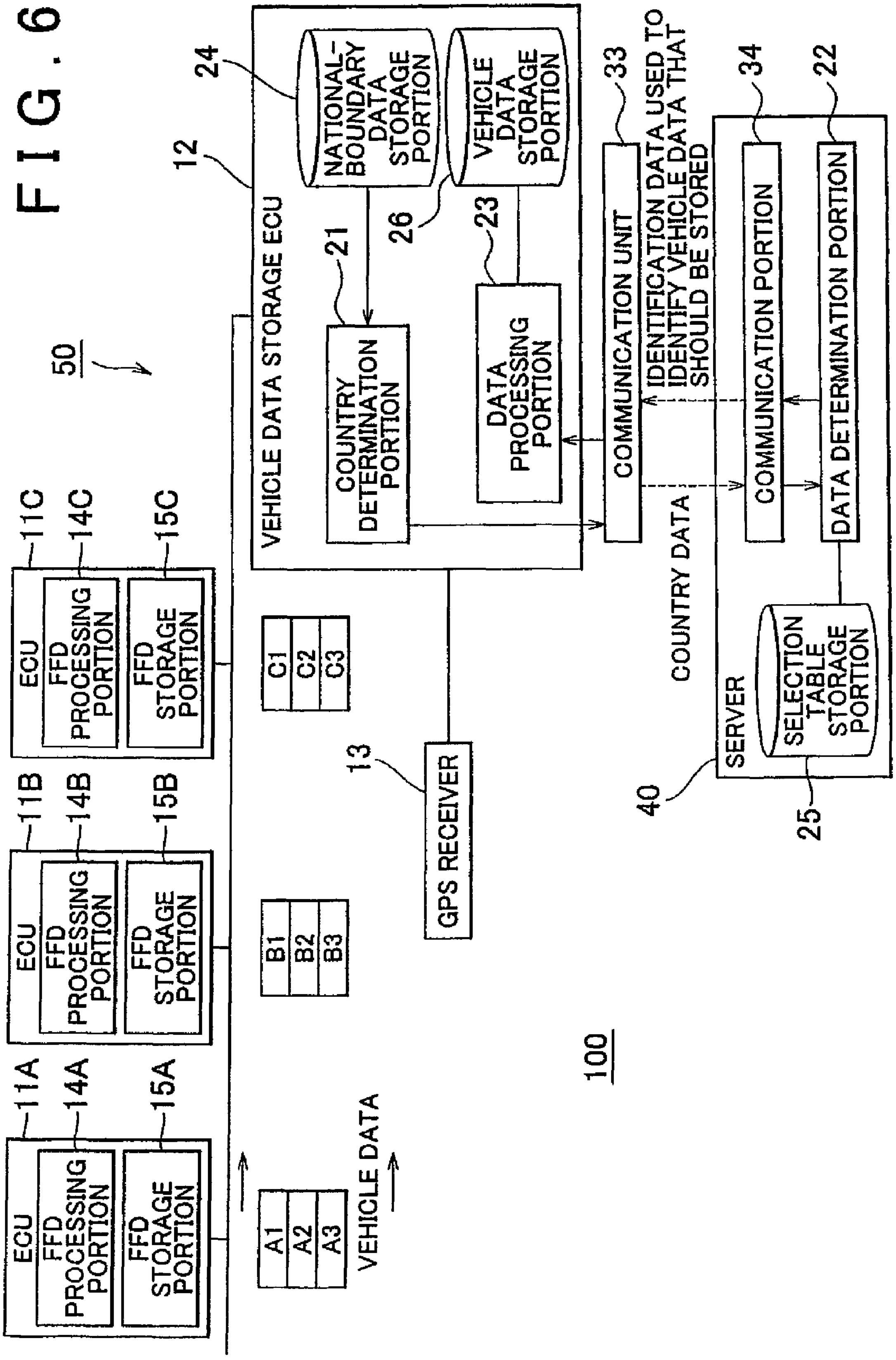
FIG. 6 is an example of a functional block diagram of the vehicle data storage system in the second embodiment.

FIG. 6 is an example of a functional block diagram of the vehicle data storage system 100 in the second embodiment. In FIG. 6, the same and corresponding portions as those in FIG. 2 are denoted by the same reference numerals, and the description thereof will be omitted. In FIG. 6, the server 40 includes the data determination portion 22 and the selection table storage portion 25. On the other hand, because the vehicle data storage ECU 12 does not determine the vehicle data that should be stored, the vehicle data storage ECU 12 does not include the data determination portion 22 or the selection table storage portion 25.

The functions of the functional blocks are the same as those in the first embodiment. Accordingly, the country determination portion 21 determines the country in which the vehicle 30 is currently traveling, based on the position data, by referring to the national-boundary data storage portion 24. Also, the data processing portion 23 stores, in the vehicle data storage portion 26, only the vehicle data permitted to be stored by the data determination portion 22.

A communication unit 33 of the vehicle 30 is connected to, for example, a base station 31 for cellular phones, or an access point in the wireless LAN, and transmits the country data according to a predetermined communication protocol (for example, TCP/IP). The country data is transmitted to the server 40 via a data server of a communication carrier such as a cellular phone carrier, and a network 32 such as the internet.

The server 40 is a computer that includes a CPU, a ROM, a RAM, a non-volatile memory, and an input/output interface. The server 40 includes the data determination portion 22. The data determination portion 22 is realized when the CPU executes a program stored in the non-volatile memory, or realized by hardware such as the ASIC. The selection table storage portion 25 is provided in the non-volatile memory.

A communication portion 34 is, for example, a Network Interface Card (NIC). The communication portion 34 receives the country data by performing, for example, protocol processing on the data transmitted from the data server of the communication carrier via a network 32. The data determination portion 22 determines the vehicle data that should be stored, based on the country data, by referring to the selection table storage portion 25. Then, the server 40 transmits the identification data used to identify the determined vehicle data that should be transmitted, to the vehicle 30 via the communication portion 34.

The vehicle data storage ECU 12 transmits the country data to the server 40. However, when the server 40 can determine the country in which the vehicle 30 is traveling based on the position data concerning the position of the vehicle 30, the vehicle data storage ECU 12 may transmit the position data to the server 40. In this case, attention needs to be paid to the handling of the position data in the country in which the vehicle 30 exists. When the position data is transmitted to the server 40, the position data associated with the identification data used to identify the vehicle 30 (for example, a telephone number used to connect to the base station 31) is transmitted to the server 40, and therefore, the relation between the personal data and an individual can be determined.

If the vehicle data storage ECU 12 knows in advance that the position data is prohibited from being stored in the country, the vehicle data storage ECU 12 transmits the country data to the server 40. However, the vehicle data storage ECU 12 does not know whether the vehicle data storage ECU 12 is permitted to transmit the position data to the server 40, during a period from when the vehicle data storage ECU 12 transmits the position data to the server 40 until when the vehicle data storage ECU 12 receives the identification data used to identify the vehicle data that should be stored, from the server 40. Accordingly, in the case where the vehicle 30 transmits the position data to the server 40, the server 40 discards the position data after the identification data, which is used to identify the vehicle data that should be stored, is determined. Also, the server 40 may change the position data to "copy-once data", and may transmit, to the vehicle 30, the position data together with the identification data used to identify the vehicle data that should be stored, and the vehicle data storage ECU 12 may discard the position data. In either case, when the position data is transmitted to the server 40 to receive the identification data used to identify the vehicle data that should be stored, the position data is discarded. Therefore, it is possible to comply with the law in the country.

Figure 7:
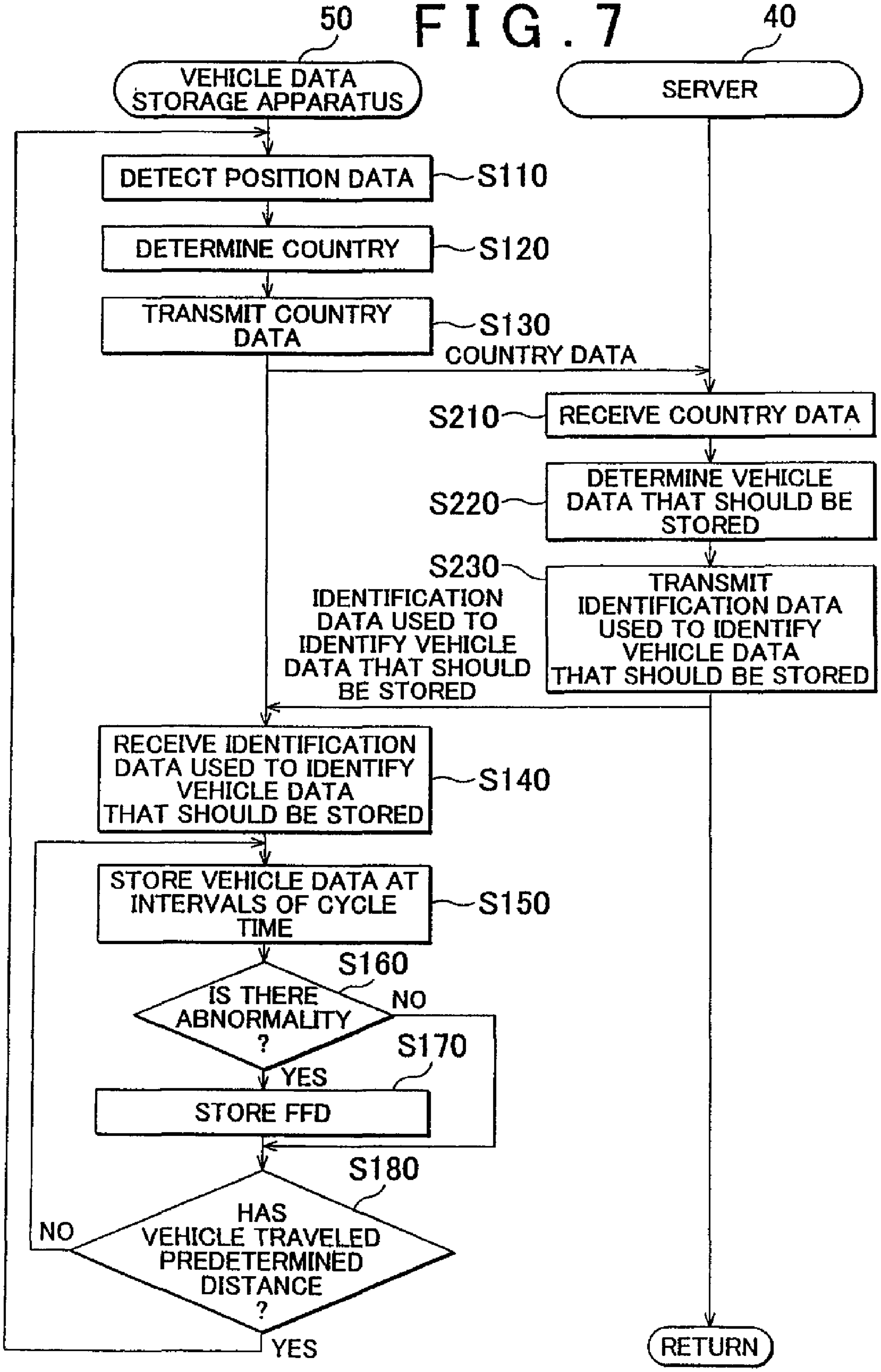
FIG. 7 is an example of a sequence diagram showing procedures for storing the vehicle data in the vehicle data storage system in the second embodiment.

FIG. 7 is an example of a sequence diagram showing procedures for storing the vehicle data in the vehicle data storage system 100. A sequence shown by the sequence diagram in FIG. 7 is started, for example, when the ignition switch of the vehicle 30 is turned on.

The vehicle data storage ECU 12 detects the position data using the GPS receiver 13, the gyro sensor, and the wheel speed sensor (S110). The country determination portion 21 determines the country in which the vehicle 30 is currently traveling, based on the position data, by referring to the national-boundary data storage portion 24 (S120), and transmits the country data to the server 40 via the communication unit 33 (S130).

Then, processes in steps S210 to 5230 are executed in the server 40. The server 40 receives the country data via the communication portion 34 (S210). Then, the data determination portion 22 of the server 40 determines the vehicle data that should be stored in the country in which the vehicle 30 is traveling, based on the country data, by referring to the selection table storage portion 25 (S220). Then, the server 40 transmits the identification data used to identify the vehicle data that should be stored, to the vehicle 30 via the communication portion 34 (S230).

Then, processes in steps S140 to S180 are executed in the vehicle 30. The vehicle data storage ECU 12 receives the identification data used to identify the vehicle data that should be stored, via the communication unit 33 (S140). The vehicle data storage ECU 12 transmits the received identification data used to identify the vehicle data that should be stored, to each ECU 11 so that the FFD is also stored according to the law in each country.

The data processing portion 23 stores, in the vehicle data storage portion 26, only the vehicle data permitted to be stored at intervals of a predetermined cycle time (S150). If an abnormality occurs (YES in step S160), the FFD processing portion 14 stores, in the FFD storage portion 15, only the FFD permitted to be stored (S170).

Then, the country determination portion 21 determines whether the vehicle 30 has traveled a predetermined distance since the country determination portion 21 determines the country last time (S180). Because the vehicle 30 does not frequently cross a national boundary, the country determination portion 21 determines the country in which the vehicle 30 is traveling, at intervals of a predetermined distance. The predetermined distance may be, for example, approximately 1 km to 5 km.

When the vehicle 30 has not traveled the predetermined distance (NO in step S180), the data processing portion 23 stores the vehicle data in the vehicle data storage portion 26 at intervals of the predetermined cycle time. When the vehicle 30 has traveled the predetermined distance (YES in step S180), the position data is detected (S110), and then, the country determination portion 21 determines the country in which the vehicle 30 is currently traveling, based on the position data, by referring to the national-boundary data storage portion 24 (S120). If the country in which the vehicle 30 exists is changed, the vehicle data storage ECU 12 transmits the country data to the server 40 via the communication unit 33 again (S130).

In the vehicle data storage system 100 in the second embodiment, it is possible to obtain the following advantageous effects, in addition to the advantageous effects obtained in the first embodiment. As described above, because the server 40 includes the selection table storage portion 25, the stored data selection table is easily updated, the configuration of the vehicle data storage ECU 12 is made simple, and therefore, an increase in the cost of the vehicle data storage ECU 12 is suppressed.

The vehicle data storage system 100 in the third embodiment will be described. In the third embodiment, the server includes the stored data selection table, the server determines the vehicle data that should be stored, by referring to the stored data selection table, and the vehicle data is stored in the server.

Figure 8:
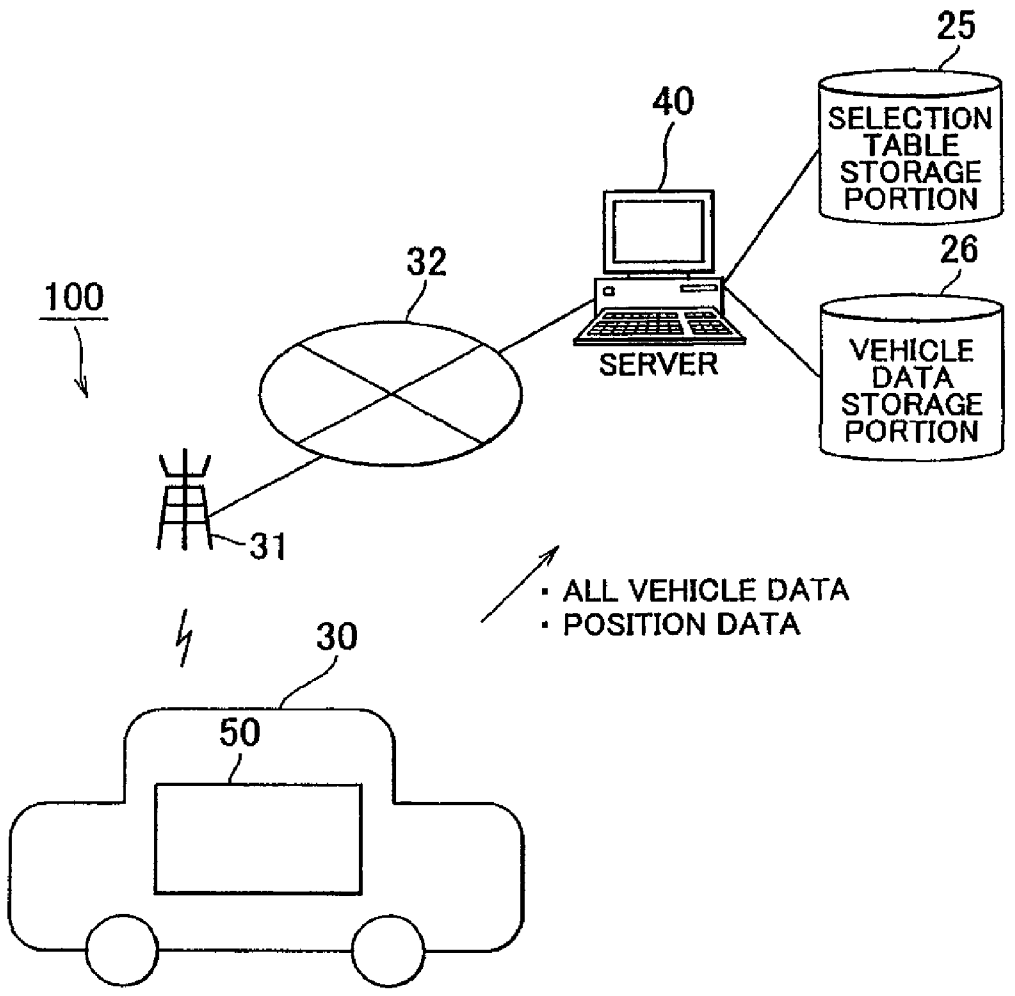
FIG. 8 is an example of a schematic configuration diagram of a vehicle data storage system in a third embodiment.

FIG. 8 is a schematic configuration diagram of the vehicle data storage system 100. In FIG. 8, the same and corresponding portions as those in FIG. 5 are denoted by the same reference numerals, and the description thereof will be omitted. In the third embodiment, the server 40 includes the selection table storage portion 25 and the vehicle data storage portion 26. That is, the vehicle data storage ECU 12 does not determine the vehicle data that should be stored, and the vehicle data is not stored in the vehicle data storage ECU 12. The vehicle 30 transmits all the vehicle data that can be stored, to the server 40.

The server 40 determines the country in which the vehicle 30 is traveling, based on the position data, and determines the vehicle data that should be stored, based on the country data concerning the determined country. Only the determined vehicle data that should be stored is stored in the server 40, and the other vehicle data are discarded.

Accordingly, in the third embodiment, the vehicle data storage ECU 12 need not include the selection table storage portion 25 and the vehicle data storage portion 26. Therefore, it is possible to further suppress an increase in the cost of the vehicle data storage ECU 12, as compared to the second embodiment.

Figure 9:
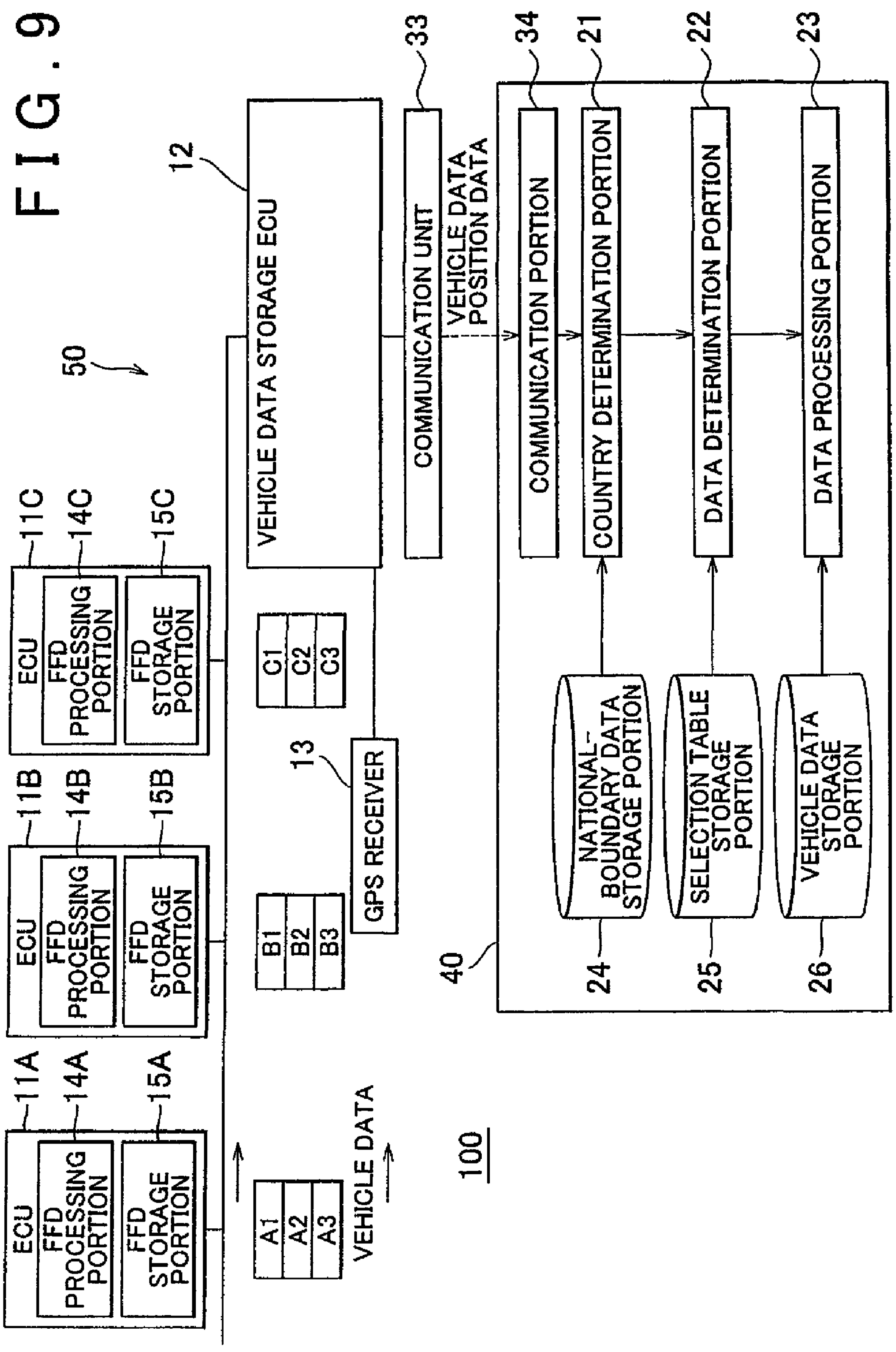
FIG. 9 is an example of a functional block diagram of the vehicle data storage system in the third embodiment.

FIG. 9 shows an example of a functional block diagram of the vehicle data storage system 100 in the third embodiment. In FIG. 9, the same and corresponding portions as those in FIG. 6 are denoted by the same reference numerals, and the description thereof will be omitted. In FIG. 9, the server 40 includes the country determination portion 21, the data determination portion 22, the data processing portion 23, the national-boundary data storage portion 24, the selection table storage portion 25, and the vehicle data storage portion 26. The functions of the functional blocks are the same as those in the first embodiment.

The vehicle data storage ECU 12 of the vehicle 30 transmits all the vehicle data received from the ECUs 11, to the server 40 via the communication unit 33. The vehicle data storage ECU 12 may transmit the vehicle data, for example, at intervals of a predetermined cycle time, at which the vehicle data is stored in the first embodiment. The vehicle data storage ECU 12 may transmit the vehicle data at regular intervals of a time longer than the cycle time. Also, the vehicle data storage ECU 12 may transmit the vehicle data each time a predetermined number of sets of the vehicle data are buffered.

Also, in the third embodiment, because the server 40 determines the country in which the vehicle 30 exists, the vehicle data transmitted from the vehicle data storage ECU 12 includes at least the position data. Because all the data including the position data are transmitted to the server 40, it may not be possible to comply with the law in the country at the time point at which the server 40 receives the vehicle data. However, because the vehicle data, which is not legally permitted to be stored, is discarded in the server 40, infringement of the law does not occur.

Figure 10:
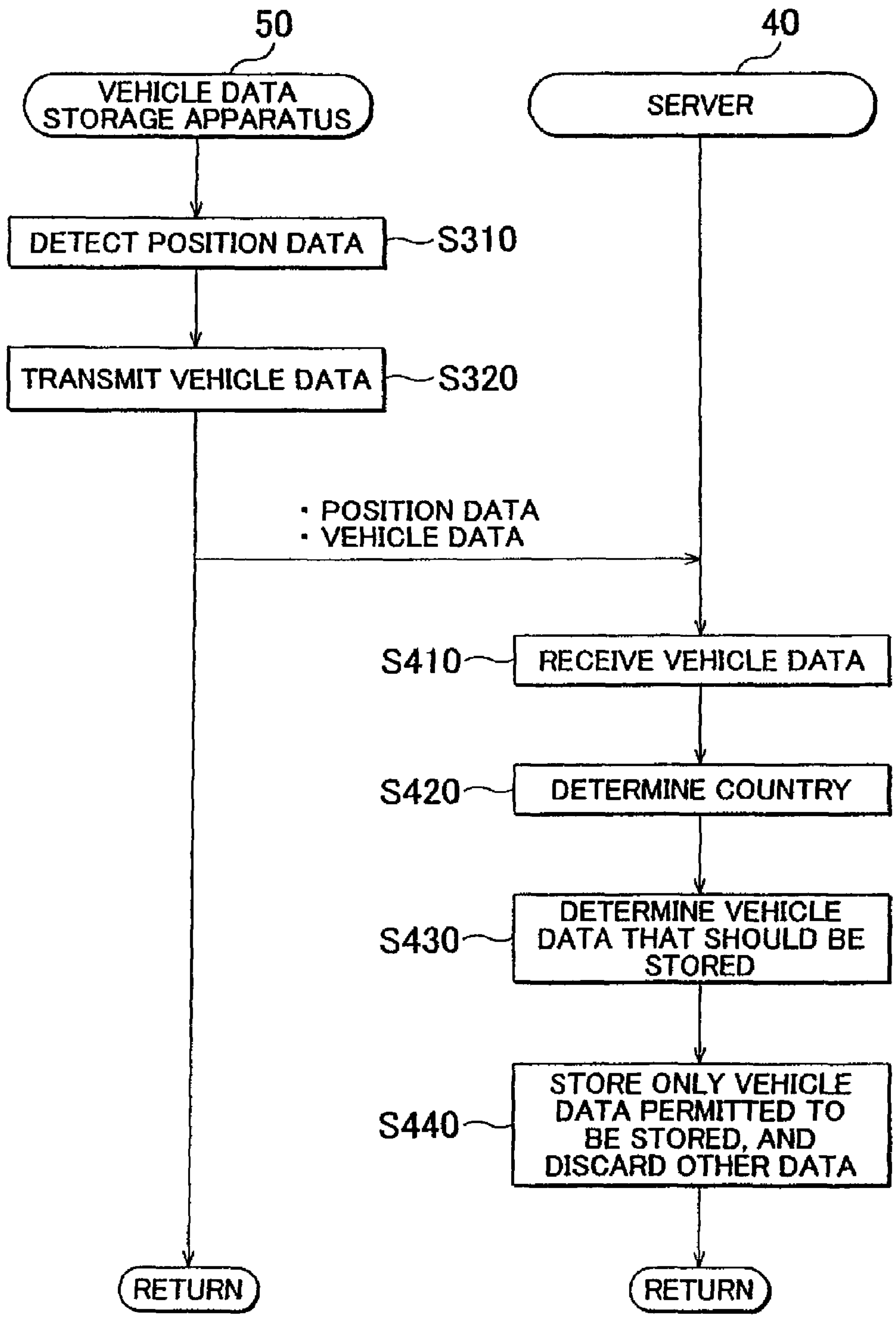
FIG. 10 is an example of a sequence diagram showing procedures for storing the vehicle data in the vehicle data storage system in the third embodiment.

FIG. 10 is an example of a sequence diagram showing procedures for storing the vehicle data in the vehicle data storage system 100. A sequence shown by the sequence diagram in FIG. 10 is started, for example, when the ignition switch of the vehicle 30 is turned on.

The vehicle data storage ECU 12 detects the position data using the GPS receiver 13, the gyro sensor, and the wheel speed sensor (S310). It is difficult to determine the country without the position data. The vehicle data storage ECU 12 transmits all the vehicle data received from the ECUs 11 and the position data, to the server 40 at a predetermined timing (S320).

Then, processes in steps S410 to S440 are executed in the server 40. When the server 40 receives the vehicle data (S410), the country determination portion 21 of the server 40 determines the country in which the vehicle 30 is currently traveling, based on the position data, by referring to the national-boundary data storage portion 24 (S420). Then, the data determination portion 22 of the server 40 determines the vehicle data that should be stored in the country in which the vehicle 30 exists, based on the country data, by referring to the selection table storage portion 25 (S430).

When the vehicle data that should be stored is determined, the data processing portion 23 stores, in the vehicle data storage portion 26, only the vehicle data permitted to be stored in the country, and discards the other vehicle data (S440).

By executing the above-described processes, only the vehicle data permitted to be stored is stored. However, the FFD that should be stored is not determined. The FFD may be stored in the vehicle 30. Alternatively, the FFD may be stored in the server 40 as well as the vehicle data. In the case where the FFD is stored in the vehicle 30, the identification data used to identify the vehicle data permitted to be stored may be transmitted from the server 40 to the vehicle 30 as in the second embodiment. Thus, if the ECU 11 in the vehicle 30 detects an abnormality, the FFD processing portion 14 stores, in the FFD storage portion 15, only the FFD permitted to be stored.

In the case where the FFD is stored in the server 40, the vehicle 30 transmits the FFD to the server 40 when an abnormality is detected. By transmitting the FFD to the server 40, the FFD is handled in the same manner as the manner in which the vehicle data is handled.

In the vehicle data storage system 100 in the third embodiment, it is possible to obtain the following advantageous effects, in addition to the advantageous effects obtained in the second embodiment. As described above, because the vehicle data is stored in the server 40, the configuration of the vehicle data storage ECU 12 is made simpler than the configuration of the vehicle data storage ECU 12 in the second embodiment. Thus, an increase in the cost of the vehicle data storage ECU 12 is further suppressed, as compared to the second embodiment.

The vehicle data storage system 100 in the fourth embodiment will be described. In the fourth embodiment, the vehicle includes the stored data selection table, and the vehicle data transmitted from the vehicle is stored in the server.

Figure 11:
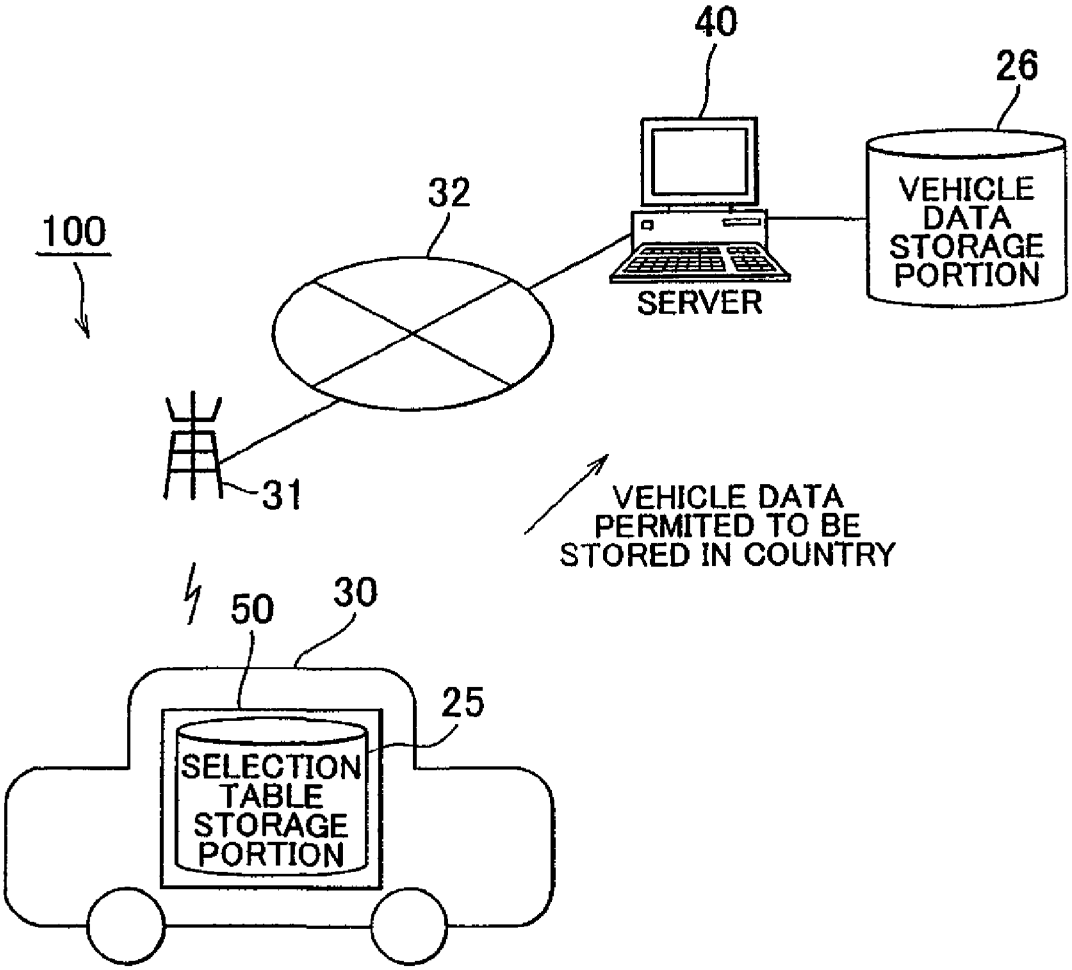
FIG. 11 is an example of a schematic configuration diagram of a vehicle data storage system in a fourth embodiment.

FIG. 11 is a schematic configuration diagram of the vehicle data storage system 100. In FIG. 11, the same and corresponding portions as those in FIG. 8 are denoted by the same reference numerals, and the description thereof will be omitted. In the fourth embodiment, the vehicle 30 includes the selection table storage portion 25, and the server 40 includes the vehicle data storage portion 26. That is, the vehicle data storage ECU 12 determines the vehicle data that should be stored, and transmits, to the server 40, only the vehicle data permitted to be stored in the country. Then, all the received vehicle data are stored in the vehicle data storage portion 26 of the server 40.

Accordingly, in the fourth embodiment, the vehicle data that is not permitted to be stored, for example, the position data that is not permitted to be stored, is not transmitted to the server 40. Therefore, it is easy to comply with the law as compared to the second and third embodiments. Also, because the server 40 includes the vehicle data storage portion 26, an increase in the cost of the vehicle data storage ECU 12 is suppressed as compared to the first embodiment.

Figure 12:
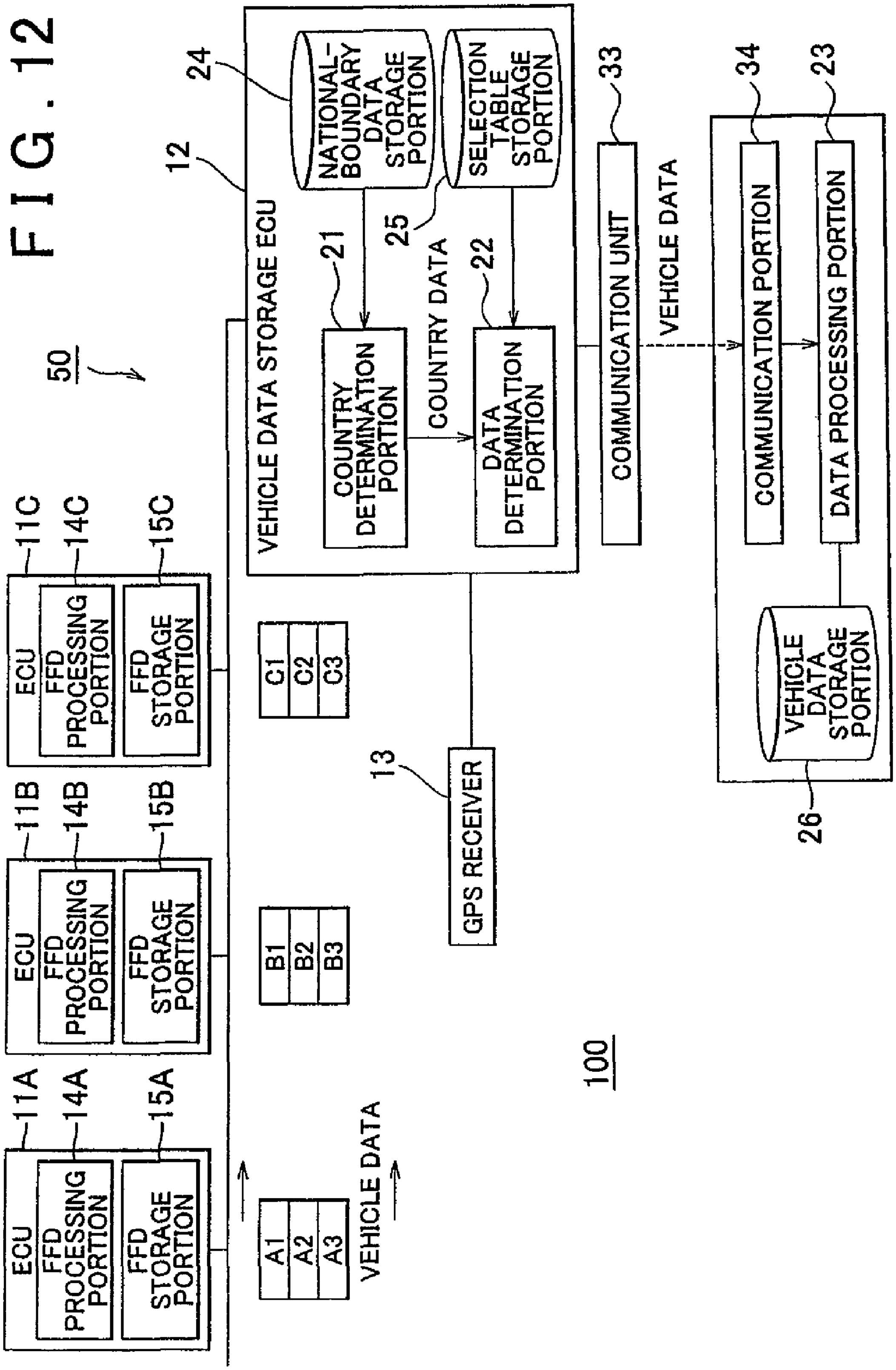
FIG. 12 is an example of a functional block diagram of the vehicle data storage system in the fourth embodiment.

FIG. 12 is an example of a functional block diagram of the vehicle data storage system 100 in the fourth embodiment. In FIG. 12, the same and corresponding portions as those in FIG. 9 are denoted by the same reference numerals, and the description thereof will be omitted. In FIG. 12, the vehicle data storage ECU 12 in the vehicle 30 includes the country determination portion 21, the data determination portion 22, the country data storage portion 24, and the selection table storage portion 25. The server 40 includes the data processing portion 23 and the vehicle data storage portion 26.

The country determination portion 21 determines the country in which the vehicle 30 is traveling, based on the position data. The data determination portion 22 determines the vehicle data that should be stored in the country, by referring to the selection table storage portion 25. The vehicle data storage ECU 12 transmits, to the server 40, only the vehicle data permitted to be stored among the vehicle data transmitted from the ECUs 11. The vehicle data storage ECU 12 discards the vehicle data that is not permitted to be stored.

The vehicle data storage ECU 12 may transmit the vehicle data, for example, at intervals of a predetermined cycle time, at which the vehicle data is stored in the vehicle 30 as in the third embodiment. The vehicle data storage ECU 12 may transmit the vehicle data at regular intervals of a time longer than the cycle time. Also, the vehicle data storage ECU 12 may transmit the vehicle data each time a predetermined number of sets of the vehicle data are buffered.

The server 40 receives the vehicle data via the communication portion 34. Because all the vehicle data received by the server 40 are the vehicle data permitted to be stored in the country, the data processing portion 23 of the server 40 stores all the received vehicle data in the vehicle data storage portion 26.

The FFD is handled in the same manner as in the manner in which the FFD is handled in the third embodiment. That is, the FFD may be stored in the server 40, or in the vehicle 30.

Figure 13:
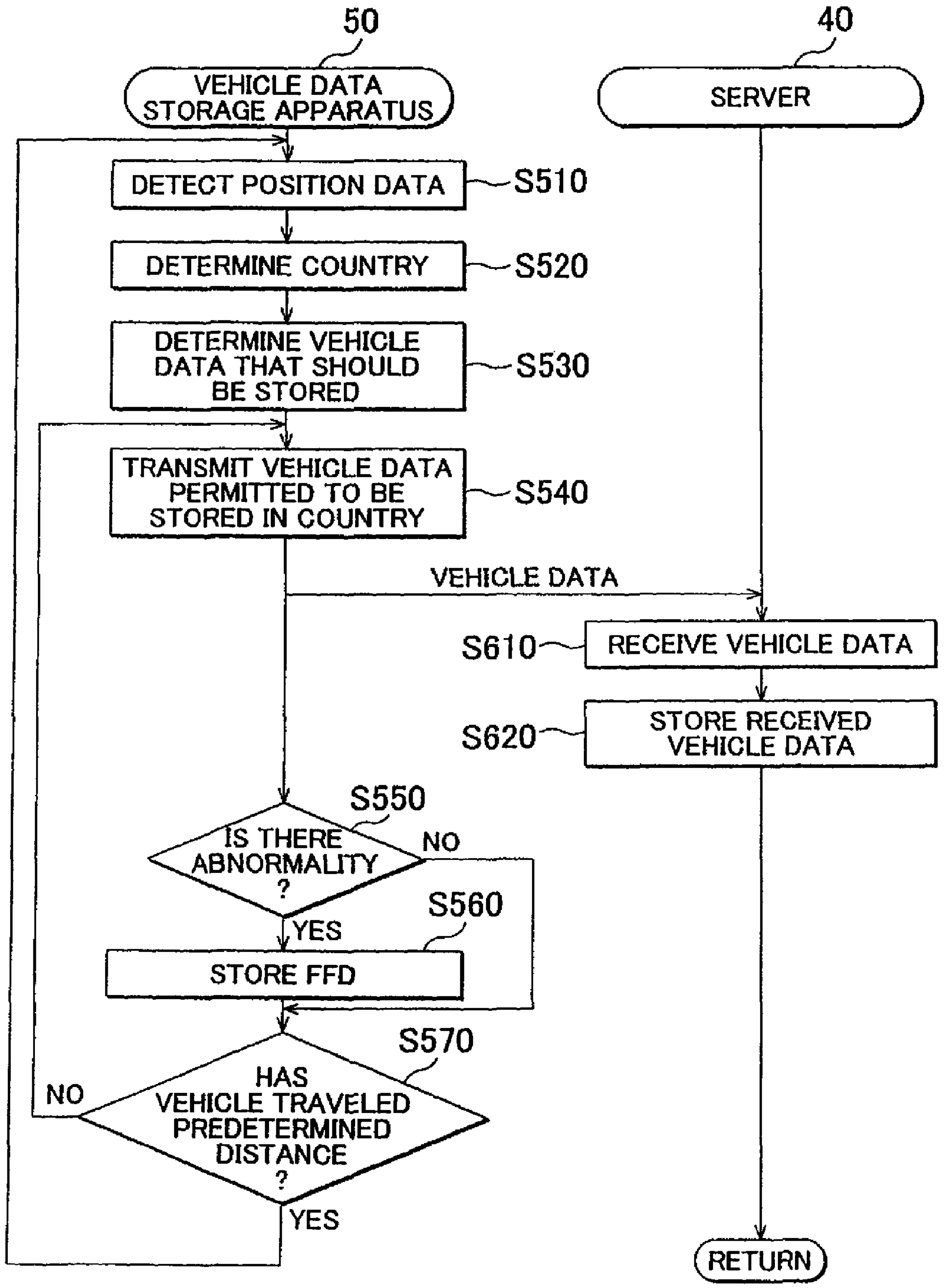
FIG. 13 is an example of a sequence diagram showing procedures for storing the vehicle data in the vehicle data storage system in the fourth embodiment.

FIG. 13 is an example of a sequence diagram showing procedures for storing the vehicle data in the vehicle data storage system 100. A sequence shown by the sequence diagram in FIG. 13 is started, for example, when the ignition switch of the vehicle 30 is turned on.

The vehicle data storage ECU 12 detects the position data using the GPS receiver 13, the gyro sensor, and the wheel speed sensor (S510). The country determination portion 21 determines the country in which the vehicle 30 is currently traveling, based on the position data, by referring to the national-boundary data storage portion 24 (S520). The data determination portion 22 obtains the country data from the country determination portion 21, and determines the vehicle data permitted to be stored, based on the country data, by referring to the selection table storage portion 25 (S530). The data determination portion 22 transmits the identification data used to identify the vehicle data permitted to be stored, to each ECU 11 so that the FFD is also stored according to the law in each country. The vehicle data storage ECU 12 transmits, to the server 40, the vehicle data permitted to be stored in the country (S540).

Processes in steps 610 to 620 are executed in the server 40. When the server 40 receives the vehicle data (S610), the data processing portion 23 stores all the received vehicle data in the vehicle data storage portion 26 (S620).

In the vehicle 30, if an abnormality occurs (YES in step S550), the FFD processing portion 14 stores, in the FFD storage portion 15, only the FFD permitted to be stored (S560). Each ECU 11 may transmit the FFD permitted to be stored, to the vehicle data storage ECU 12, and the vehicle data storage ECU 12 may transmit the FFD to the server 40. Thus, the FFD is also handled in the same manner as in the manner the vehicle data is handled.

Then, the country determination portion 21 determines whether the vehicle 30 has traveled a predetermined distance since the country determination portion 21 determines the country last time (S570). Because the vehicle 30 does not frequently cross a national boundary, the country determination portion 21 determines the country in which the vehicle 30 is traveling, at intervals of a predetermined distance. The predetermined distance may be, for example, approximately 1 km to 5 km. When the vehicle 30 has not traveled the predetermined distance (NO in step S570), the sequence proceeds to step S540. In step S540, the vehicle data storage ECU 12 transmits, to the server 40, only the vehicle data permitted to be stored among all the vehicle data transmitted from the ECUs 11. When the vehicle 30 has traveled the predetermined distance (YES in step S570), the position data is detected (S510), the country is determined (S520), and the vehicle data that should be stored is determined (S530).

In the vehicle data storage system 100 in the fourth embodiment, it is possible to obtain the following advantageous effects, in addition to the advantageous effects obtained in the first embodiment. As described above, because the vehicle data is stored in the server 40, the configuration of the vehicle data storage ECU 12 is made simpler than the configuration of the vehicle data storage ECU 12 in the first embodiment, and an increase in the cost of the vehicle data storage ECU 12 is suppressed, as compared to the first embodiment. Also, because the vehicle data, which is not permitted to be stored in the country, is not transmitted to the server 40, it is easy to comply with the law, as compared to the second and third embodiments.

In each of the first to fourth embodiments, it is possible to store the vehicle data according to the law in each country. However, in the case where the vehicle 30 includes the vehicle data storage portion 26 (as in the first and second embodiments), because the vehicle 30 may cross the national boundary, the vehicle data in the vehicle data storage portion 26, which is legally permitted to be stored in the country X, may not be legally permitted to be stored in the country Y. In this case, the vehicle data may be handled in the following manners. (a) First, priority is given to following the law in the country Y. That is, in the case where the law in the country Y does not make it mandatory to erase the vehicle data stored before the vehicle enters the country Y even if the vehicle data is not permitted to be stored in the country Y, the vehicle data stored in the country X is maintained in the vehicle 30.

In the case where the law in the country Y makes it mandatory to erase the vehicle data stored before the vehicle enters the country Y, the vehicle data prohibited from being stored in the country Y, among the vehicle data stored in the country X, is erased. (b) In the country Y, there may be no law that stipulates how to handle the vehicle data stored before the vehicle enters the country Y. Even in this case, it may be prohibited to use the vehicle data that is not permitted to be stored in the country Y (for example, it may be prohibited to read out the vehicle data, to identify an individual using the vehicle data, and to transfer the vehicle data). Therefore, it is necessary to determine how to handle the vehicle data that is not permitted to be stored in the country Y, among the vehicle data stored in the country X.

There are two methods of handling the vehicle data that is not permitted to be stored in the country Y. In one method, the vehicle data, which is not permitted to be stored in the country Y, is erased. In the other method, it is prohibited to read out the vehicle data that is not permitted to be stored in the country Y, instead of erasing the vehicle data. If the vehicle data is erased, it is possible to reliably comply with the law in the country Y, regardless of operation of the law. If the vehicle data is prohibited from being read out, the previous vehicle data can be used to analyze an abnormality after the vehicle returns to the country X.

Accordingly, in the vehicle data storage system 100 in a fifth embodiment, the vehicle data stored in the country X is prohibited from being read out in the country Y, instead of erasing the vehicle data. The vehicle data storage system 100 in the fifth embodiment will be described.

In the fifth embodiment, the vehicle 30 includes the vehicle data storage portion 26 as in the first embodiment or the second embodiment. Therefore, the functional block diagram in FIG. 2 or FIG. 6 may be used to make a functional block diagram in the fifth embodiment. Hereinafter, the fifth embodiment will be described with reference to the functional block diagram similar to FIG. 2 in the first embodiment.

Figure 14:
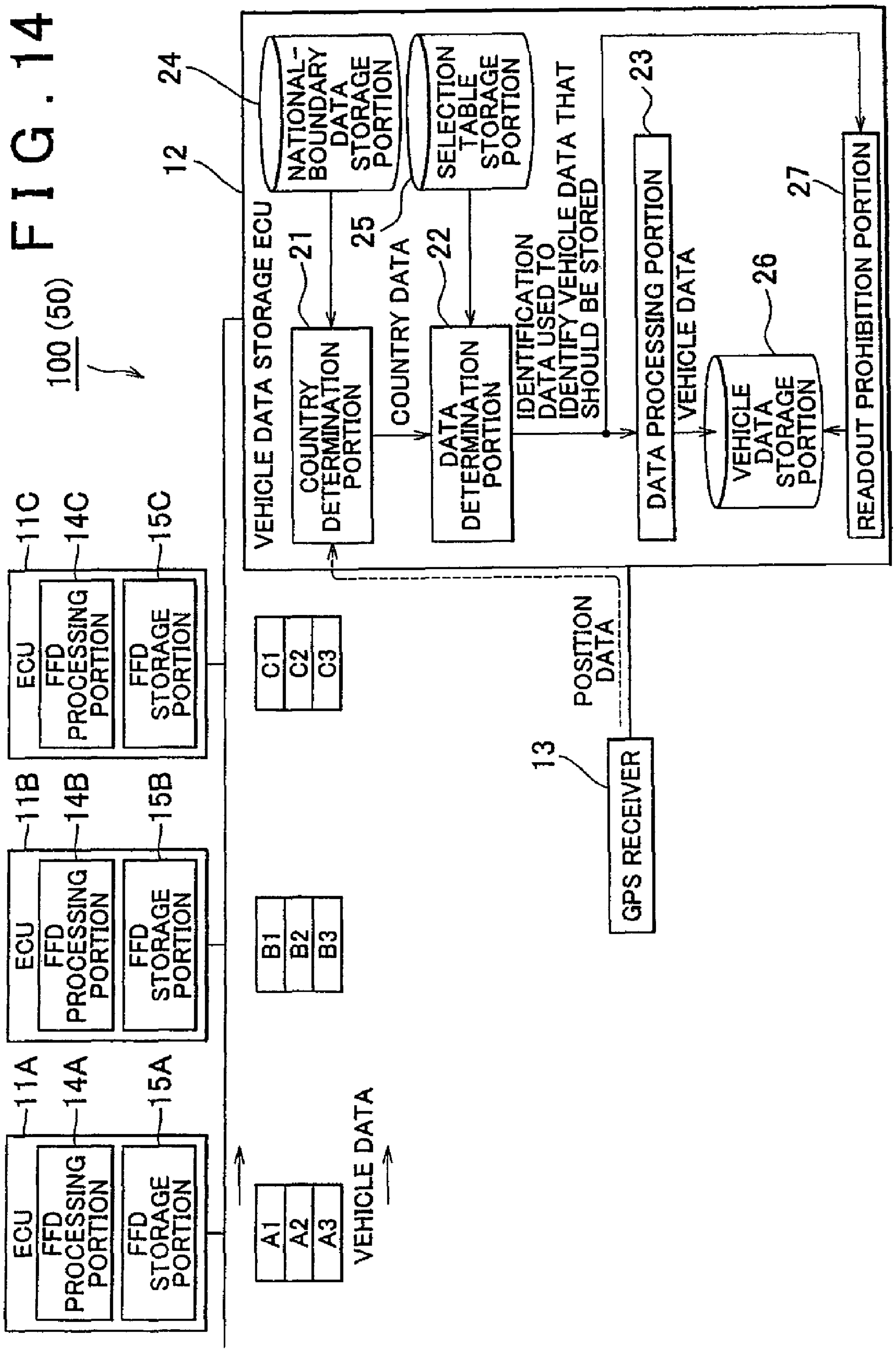
FIG. 14 is an example of a function block diagram of a vehicle data storage system in fifth embodiment.

FIG. 14 is an example of the functional block diagram of the vehicle data storage system 100. In FIG. 14, the same and corresponding portions as those in FIG. 2 are denoted by the same reference numerals, and the description thereof will be omitted. The vehicle data storage ECU 12 in FIG. 14 includes a readout prohibition portion 27. The readout prohibition portion 27 obtains, from the data determination portion 22, the identification data used to identify the vehicle data that is permitted to be stored (or the vehicle data that is prohibited from being stored). If the vehicle data, which is prohibited from being stored, has been already stored, the vehicle data is prohibited from being read out. For example, when there is a request for reading out the vehicle data from the outside, the readout prohibition portion 27 examines whether there is the vehicle data, which is prohibited from being stored in the country, among the vehicle data stored in the vehicle data storage portion 26. The readout prohibition portion 27 prohibits readout of the vehicle data prohibited from being stored.

Because the FFD should be also handled in the same manner as the manner in which the vehicle data is handled, it is prohibited to read out the FFD that is the same as the vehicle data prohibited from being stored, among the FFD stored in the FFD storage portion 15.

The phrase "the vehicle data is read out from the outside" signifies that, for example, the server 40 makes a request for transmitting the vehicle data to the server 40 through wireless communication, or a diagnostic tool reads out the vehicle data by communicating with a vehicle-mounted LAN through CAN communication, using wired connection. The manner in which the vehicle data is read out from the outside is not limited.

Figure 15:
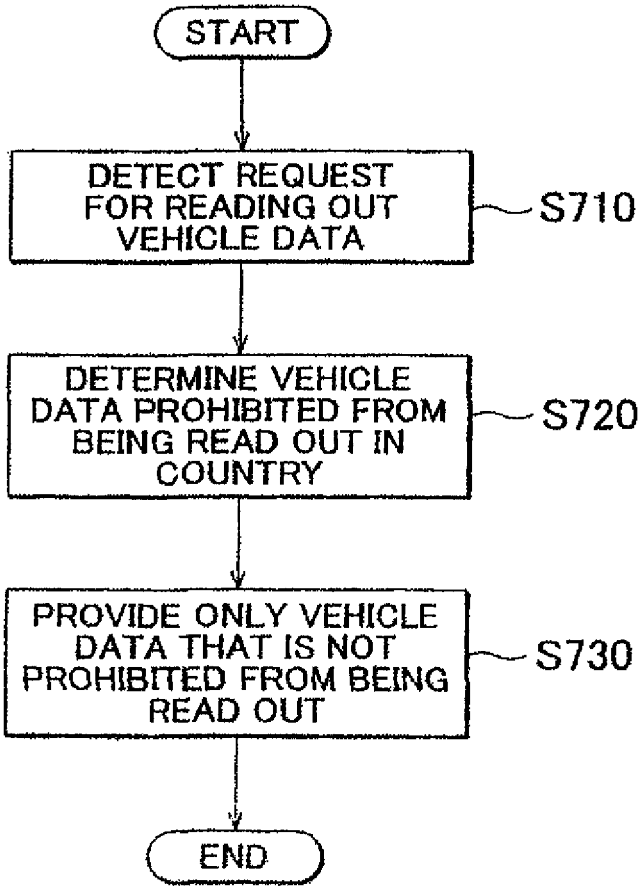
FIG. 15 is an example of a flowchart showing procedures for reading out the vehicle data and FFD.

FIG. 15 is an example of a flowchart showing procedures for reading out the vehicle data and the FFD. In FIG. 15, the vehicle data have been already stored in the vehicle data storage portion 26 in the vehicle 30. If an abnormality has occurred, the FFD has been stored in the FFD storage portion 15.

A sequence shown in the flowchart in FIG. 15 is started when there is a request for reading out the vehicle data or the FFD from the outside (S710).

When the request for reading out the vehicle data or the FED is detected, the readout prohibition portion 27 determines the vehicle data that is prohibited from being read out in the country (S720). More specifically, for example, when a service center reads out the vehicle data, the readout prohibition portion 27 determines the vehicle data that is prohibited from being read out in the country determined based on the current position of the vehicle 30. When a request for reading out the vehicle data is output from the server 40, for example, the readout prohibition portion 27 determines the vehicle data that is prohibited from being read out in the country in which the server 40 is located. The country to which the server 40 belongs (the law with which the server 40 should comply) may be determined according to the law in each country.

The data determination portion 22 transmits, to the readout prohibition portion 27, the identification data used to identify the vehicle data permitted to be stored or prohibited from being stored, based on the country data determined by the country determination portion 21 based on the position data. Therefore, based on the identification data, the readout prohibition portion 27 determines the vehicle data prohibited from being read out in the country, among the vehicle data that have been already stored in the vehicle data storage portion 26.

When there is a request for reading out the vehicle data, a request for reading out the FFD is likely to be made. In this case, each ECU 11 does not provide the FFD directly to the outside. Instead, the vehicle data storage ECU 12 receives all the FED from the ECUs 11 and then provides the FED to the outside. Therefore, the readout prohibition portion 26 can prohibit readout of the FFD, as well as the vehicle data.

Then, the vehicle data storage ECU 12 provides, to the outside, only the vehicle data and the FFD that are not prohibited from being read out (S730).

According to the fifth embodiment, the vehicle data is prohibited from being read out, or permitted to be read out, at the time point at which a request for reading out the vehicle data is made. Therefore, even if the vehicle data stored in the vehicle 30 is legally prohibited from being stored in the country into which the vehicle 30 moves after crossing a national boundary, it is possible to comply with the law in the country.

In the case where the vehicle data, which is not permitted to be stored in the country, is erased instead of prohibiting the vehicle data from being read out, the vehicle data may be erased when a request for reading out the vehicle data is made, or when the vehicle 30 crosses a national boundary. In the case where the vehicle data is erased when the vehicle 30 crosses a national boundary, it is possible to minimize the time period in which the vehicle data, which is not legally permitted to be stored, is stored. In the case where the vehicle data is erased when a request for reading out the vehicle data is made, it is expected that the vehicle data has been already overwritten and thus erased when the request for reading out the vehicle data is made, because the vehicle data are overwritten in order from the oldest data. Therefore, it is possible to minimize an increase in a processing load due to the erasing process.

As described above, in the vehicle data storage system 100 according to each of the embodiments, it is possible to store the vehicle data according to various laws concerning the handling of personal data in different countries.

The invention claimed is:

1. A vehicle data storage system in which vehicle data obtained from a vehicle-mounted device is stored, comprising:

a vehicle data-storage portion in which the vehicle data is stored;

a country determination portion that determines a country in which a vehicle exists, based on position data of the vehicle;

a selection table storage portion in which a type of the vehicle data that should be stored in the vehicle data storage portion is stored in association with country data;

a data determination portion that determines the type of the vehicle data that should be stored in the vehicle data storage portion, based on the country determined by the country determination portion, by referring to the selection table storage portion, so that the vehicle data is stored according to a law of the country determined by the country determination portion;

a data processing portion that stores, in the vehicle data storage portion, the vehicle data determined by the data determination portion; and a readout prohibition portion that, when the vehicle has moved from a first country in which first vehicle data that is the vehicle data stored in the vehicle data storage portion is legally permitted to be stored, to a second country in which the first vehicle data is not legally permitted to be stored, prohibits readout of the first vehicle data in the second country.

2. The vehicle data storage system according to claim 1, further comprising an abnormality data storage portion in which the vehicle data is stored if an abnormality occurs in the vehicle or the vehicle-mounted device.

3. A vehicle data storage server that includes the vehicle data storage system according to claim 1, further comprising a receiving portion that receives the position data of the vehicle and the vehicle data.

4. A vehicle data storage system according to claim 1, further comprising a vehicle data storage apparatus which is provided in the vehicle, and in which vehicle data obtained from the vehicle-mounted device is stored, the vehicle data storage apparatus comprising:

the vehicle data storage portion;

the country determination portion;

a transmission portion that transmits, to a server, country data concerning the country determined by the country determination portion;

a receiving portion that receives identification data used to identify the vehicle data that should be stored in the vehicle data storage portion, wherein the server determines the vehicle data that should be stored in the vehicle data storage portion by referring to a selection table storage portion in which a type of the vehicle data that should be stored in the vehicle data storage portion is stored in association with the country data concerning each country; and a data processing portion that changes the type of the vehicle data that should be stored in the vehicle data storage portion, based on the identification data received by the receiving portion.

5. A vehicle data storage system according to claim 1, further comprising a vehicle data storage server which receives, from the vehicle, vehicle data obtained from the vehicle-mounted device, and in which the vehicle data is stored, the vehicle data storage server comprising:

a receiving portion that receives the vehicle data transmitted to the server from the vehicle; and the vehicle data storage portion, wherein the vehicle determines the vehicle data that should be stored in the vehicle data storage portion, based on country data concerning a country determined based on position data of the vehicle, by referring to a selection table in which a type of the vehicle data that should be stored in the vehicle data storage portion is stored in association with the country data concerning each country, and transmits the determined vehicle data.

6. A vehicle data storage system according to claim 1, further comprising a vehicle data storage apparatus which is provided in the vehicle, and in which vehicle data obtained from the vehicle-mounted device is transmitted to a server, the vehicle data storage apparatus comprising:

the country determination portion;

the selection table storage portion;

the data determination portion; and a transmission portion that transmits the vehicle data determined by the data determination portion, to the server that includes the vehicle data storage portion.

7. A vehicle data storage method in which vehicle data obtained from a vehicle-mounted device is stored, comprising:

determining a country in which a vehicle exists, based on position data of the vehicle;

determining the vehicle data that should be stored, based on the determined country, by referring to a selection table in which the vehicle data that should be stored is stored in association with country data, so that the vehicle data is stored according to a law of the determined country;

storing the determined vehicle data; and when the vehicle has moved from a first country in which first vehicle data that is the vehicle data stored in the vehicle data storage portion is legally permitted to be stored, to a second country in which the first vehicle data is not legally permitted to be stored, prohibiting the readout of the first vehicle data in the second country.

* * * * *